United States Patent
Liu et al.

(10) Patent No.: US 11,561,635 B1
(45) Date of Patent: Jan. 24, 2023

(54) INTEGRATED TOUCH MODULE AND TOUCH DISPLAY DEVICE HAVING THE SAME

(71) Applicant: TPK Touch Solutions (Xiamen) Inc., Fujian (CN)

(72) Inventors: Ming-Chung Liu, Miaoli (TW); Yi-Lung Yang, Taoyuan (TW); Ya-Chin Chang, Taichung (TW); Po-Yu Hsiao, Taoyuan (TW); Xue-Fen Wang, Taoyuan (TW); Sheng-Fa Liu, Taoyuan (TW); Wei-Chou Chen, Taoyuan (TW)

(73) Assignee: TPK Touch Solutions (Xiamen) Inc., Fujian (CN)

( * ) Notice: Subject to any disclaimer, the term of this patent is extended or adjusted under 35 U.S.C. 154(b) by 0 days.

(21) Appl. No.: 17/560,396

(22) Filed: Dec. 23, 2021

(51) Int. Cl.
 *G06F 3/041* (2006.01)
 *G02B 5/30* (2006.01)
 *G06F 3/042* (2006.01)

(52) U.S. Cl.
 CPC ......... *G06F 3/0412* (2013.01); *G02B 5/3016* (2013.01); *G02B 5/3041* (2013.01); *G02B 5/3083* (2013.01); *G06F 3/042* (2013.01)

(58) Field of Classification Search
 None
 See application file for complete search history.

(56) References Cited

U.S. PATENT DOCUMENTS

| 2010/0118243 | A1* | 5/2010 | Majumdar | ............. | H01G 11/48 428/323 |
| 2011/0205471 | A1* | 8/2011 | Wang | ................ | G02F 1/133528 349/96 |
| 2015/0355490 | A1* | 12/2015 | Kao | ..................... | G02F 1/13338 349/12 |
| 2016/0118448 | A1* | 4/2016 | Epstein | ............... | H01L 51/5271 257/40 |
| 2019/0079231 | A1* | 3/2019 | Sumimura | ............. | C08G 63/64 |
| 2020/0064671 | A1* | 2/2020 | Kawahira | ............. | G02F 1/1347 |

FOREIGN PATENT DOCUMENTS

TW   I663460 B   6/2019

* cited by examiner

*Primary Examiner* — Duane N Taylor, Jr.
(74) *Attorney, Agent, or Firm* — Cooper Legal Group, LLC

(57) ABSTRACT

An integrated touch module and a touch display device are provided. The integrated touch module has a touch sensing structure formed on a polymer film. The polymer film, a liquid crystal phase retardation layer, and a linear polarizing layer constitute a circular polarizing element. The average reflectance of the circular polarizing element in the visible light range is less than 5%, and the standard deviation of the reflectance is less than 0.2%. The touch display device includes the integrated touch module.

11 Claims, 5 Drawing Sheets

INTEGRATED TOUCH MODULE AND
TOUCH DISPLAY DEVICE HAVING THE
SAME

FIELD OF THE DISCLOSURE

The present disclosure relates to an integrated touch module and a touch display device including the integrated touch module, and in particular to an ultra-thin integrated type touch control module which is bendable and has wideband optical performance, and a touch display device including the integrated touch module.

BACKGROUND OF THE DISCLOSURE

A circular polarizer (CPOL) at present mainly has a retarder and a linear polarizer, which is often used as an anti-reflection film in the display field to solve a display problem due to a reflection of incident light from an external environment, wherein the retarder can be a quarter wave plate (QWP). FIG. 1 is a schematic diagram illustrating an anti-reflection sheet receiving the incident light from the external environment. As shown in FIG. 1, theoretically, when the incident light L from the outside passes through the outermost linear polarizing layer 10a, the linear polarizing layer 10a converts the incident light L into a linearly polarized incident light L1, and the polarization direction of the linearly polarized incident light L1 is vertical, then, the linearly polarized incident light L1 enters the quarter-wave plate used as the retarder 20a, so that the linearly polarized incident light L1 produces a phase delay, and the linearly polarized incident light L1 is converted into left-handed polarized light Lcl. Then, when the light is reflected by the display panel 200, the light will form the reverse right-handed polarized light Lcr, and then pass through the quarter wave plate used as the retarder 20a, and thus the polarization direction of the linearly polarized incident light L2 and the polarization direction of the linearly polarized incident light L1 are finally orthogonal, so that the incident light from the external environment cannot pass through the linear polarizing layer 10a and is blocked in the circular polarizer. From the above principle, the anti-reflection sheet circular polarizing the external ambient light is the first step of the above-mentioned anti-reflection mechanism, so circular polarizing of the external ambient light is one of the important factors of the anti-reflection effect, but in fact, the anti-reflection mechanism cannot occur in all of the visible light range. All incident light inside is not ideally circular polarized, causing ambient light of certain wavelengths to still be reflected by the display panel 200, resulting in interference when the user views the screen.

Taiwan Patent No. I663460 (hereinafter referred to as the patent I663460) discloses a wideband compensation laminate, including a chiral-half-wave phase compensation coating film and a chiral-quarter-wave phase compensation coating film. The chiral-quarter-wave phase compensation coating film and the chiral-half-wave phase compensation coating film directly contact each other. The wideband compensation laminate disclosed in the patent I663460 is a technical solution proposed to solve the above-mentioned problems of reflected lights. For example, it is mentioned in para. [0014] of the patent I663460 that, "the ability of the compensation film to convert circular polarization is wideband compensation film".

However, the reflectance of the wideband compensation film of the patent I663460 in the visible light range is still too high to effectively remove the reflection of ambient light. For example, as shown in Table 3 of the patent I663460, the reflectance of the compensation film of the patent I663460 under wavelengths of 450 nm, 550 nm, and 650 nm is about 8%. Since the circular polarizer is mainly used for anti-reflecting of ambient light, if the reflectance is higher, the effect of anti-reflecting of ambient light is worse, which may affect the display effect of the terminal product, resulting in reflection under heavy external light that interferes with reading. The applicant believes that the reflectance (8%) of the wideband compensation film in the visible light range of the patent I663460 cannot meet the increasingly sophisticated display requirements, especially the current high-resolution and high-quality videos, such as 4K and 8K videos, that have been favored by users. It is worth noting that Table 4 of the patent I663460 discloses a wideband compensation film with a reflectance of about 4-5%. However, compared to the examples in Table 3, the patent I663460 does not clearly specify what factors cause the difference in reflectance, so those of ordinary skill in the art have no idea about how to implement it.

On the other hand, the materials of the chiral-half-wave phase compensation coating film and the chiral-quarter-wave phase compensation coating film of patent I663460 both are made of anisotropic liquid crystal (also called liquid crystal phase retardation layer). At present, the assembly of touch sensing electrodes on the display as a touch display screen is one of the important human-machine interfaces. For the purpose of making the product thinner, the touch sensing electrodes will be integrated and fabricated on other components as possible, and the patent I663460 uses anisotropic liquid crystal, which cannot be directly used as the substrate to support the touch sensing structure during the manufacturing process. In other words, an adhesive layer and/or a supporting substrate must be used as the carrier material to provide the strength of the mechanism. Therefore, the thickness of the touch sensing electrode and the anti-reflection film integrally combined cannot be reduced, which does not follow the current trend of increasingly thinner and lighter displays.

Furthermore, in the optical film industry, in order to achieve efficiency of production and consider adaption of material, a half-wave phase compensation layer (or half-wave plate (HWP)) and quarter-wave phase compensation layer (or quarter-wave plate (QWP)) are made of the same material type. For example, patent I66346 uses the same liquid crystal material to make the chiral-half-wave phase compensation layer and chiral-quarter-wave phase compensation layer. Before this application, there is no document that teaches or recommends the use of combinations of optical films with different materials from the view of solving the problem of how to integrate elements with optical effects and electrical signal functions and how to manufacture the integration of the two components.

Therefore, the present disclosure was provided in view of the above-mentioned problems.

SUMMARY OF THE DISCLOSURE

The object of the present disclosure is to provide an integrated touch module, wherein the integrated touch module is integrated by an electrical signal processing element (touch sensing structure) and an optical element (phase retardation layer/polarizing layer). The two components with different characteristics/functions will not compromise the respective characteristics when matched, and the two components can simultaneously make the product thinner to meet the integration requirements, so as to realize a bendable and ultra-thin integrated touch module.

Another object of the present disclosure is to provide an integrated touch module, wherein an average reflectance of the circular polarizing element in a visible light range is less than 5% and a standard deviation of the reflectance is less than 0.2%, so that an integrated touch module with high and uniform wideband anti-reflectance can be realized. The wideband range refers to covering the visible light range (450 nm-675 nm), that is, the integrated touch module of the present disclosure has uniform and consistent phase retardation characteristics and low reflection characteristics over the entire visible light range.

Another object of the present disclosure is to provide an integrated touch module, wherein the polymer film of the integrated touch module can be directly used as a substrate to form a touch sensing structure on the polymer film. There is no need to additionally provide a substrate, and after the manufacturing process of the touch sensing structure, the polymer film can retain the original optical characteristics.

The integrated touch module of the present disclosure includes: a silver nanowire touch sensing structure formed on a polymer film, the polymer film having a phase retardation value of between 100 nm and 160 nm for a wavelength of 550 nm; wherein the polymer film, a liquid crystal phase retardation layer, and a linear polarizing layer constitute a circular polarizing element, an average reflectance of the circular polarizing element in a visible light range is less than 5% and a standard deviation of the reflectance is less than 0.2%.

Preferably, according to the integrated touch module of the present disclosure, the average reflectance of the integrated touch module in the visible light range is less than 6% and the standard deviation of the reflectance is less than 0.4%.

Preferably, according to the integrated touch module of the present disclosure, the average reflectance of the circular polarizing element in a wavelength range of 450 nm-500 nm is less than 6%, and a reflectance difference between the average reflectance of the circular polarizing element in the wavelength range of 450 nm-500 nm and the reflectance for the wavelength of 550 nm is less than 5%. Alternatively, the average reflectance of the circular polarizing element in the wavelength range of 450 nm-500 nm is less than 6%, and the reflectance difference between the average reflectance of the circular polarizing element in the wavelength range of 450 nm-500 nm and the reflectance at the wavelength of 550 nm is less than 4.5% or less than 3.5%.

Preferably, according to the integrated touch module of the present disclosure, a reflectance difference between the average reflectance of the circular polarizing element in the wavelength range of 450 nm-500 nm and the average reflectance of the wavelength range of 525 nm-675 nm is less than 10%. Alternatively, the reflectance difference between the average reflectance of the circular polarizing element in the wavelength range of 450 nm-500 nm and the average reflectance of the wavelength range of 525 nm-675 nm is less than 7% or less than 5.5%.

Preferably, according to the integrated touch module of the present disclosure, the polymer film is configured to withstand a process temperature of the silver nanowire touch sensing structure.

Preferably, according to the integrated touch module of the present disclosure, a glass transition temperature of the polymer film is greater than or equal to a highest process temperature of making the silver nanowire touch sensing structure on the polymer film.

Preferably, according to the integrated touch module of the present disclosure, the polymer film is a positive dispersion type phase retardation layer with a thickness of about 25 μm; the liquid crystal phase retardation layer is a positive dispersion type phase retardation layer which has a thickness of about 2 μm, and an optical axis difference between the polymer film and the liquid crystal phase retardation layer is about 60 degrees.

Preferably, according to the integrated touch module of the present disclosure, the highest process temperature of the silver nanowire touch sensing structure is 135-140° C., and a main component of the polymer film is a methyl acrylate (PMMA), cycloolefin polymer (COP), polycarbonate (PC), polyethylene terephthalate (PET), colorless polyimide (CPI) or derivatives thereof, and the glass transition temperature of the polymer film is greater than or equal to 135-140° C.

Preferably, according to the integrated touch module of the present disclosure, the silver nanowire touch sensing structure includes: a silver nanowire electrode layer directly disposed on the polymer film.

Preferably, according to the integrated touch module of the present disclosure, the silver nanowire touch sensing structure includes: two silver nanowire electrode layers, the two silver nanowire electrode layers are respectively arranged on an upper surface and a lower surface of the polymer film.

Preferably, the integrated touch module according to the present disclosure, the linear polarizing layer is disposed above the liquid crystal phase retardation layer.

In addition, the present disclosure further provides a touch display device including: a display panel having a display area; and the above-mentioned integrated touch module disposed on the display panel, wherein the silver nanowire touch sensing structure of the integrated touch module correspondingly overlaps the display area.

Preferably, according to the touch display device of the present disclosure, the touch display panel is a liquid crystal display panel, an organic electroluminescence display panel, an organic light emitting diode display panel, or a micro light emitting diode display panel. However, the present disclosure is not limited to this.

In order to enable those skilled in the art to understand the purpose, features, and effects of the present disclosure, the present disclosure will be described in detail with the following specific embodiments along with the accompanying drawings.

DETAILED DESCRIPTION OF THE PREFERRED EMBODIMENT

Figure 1:
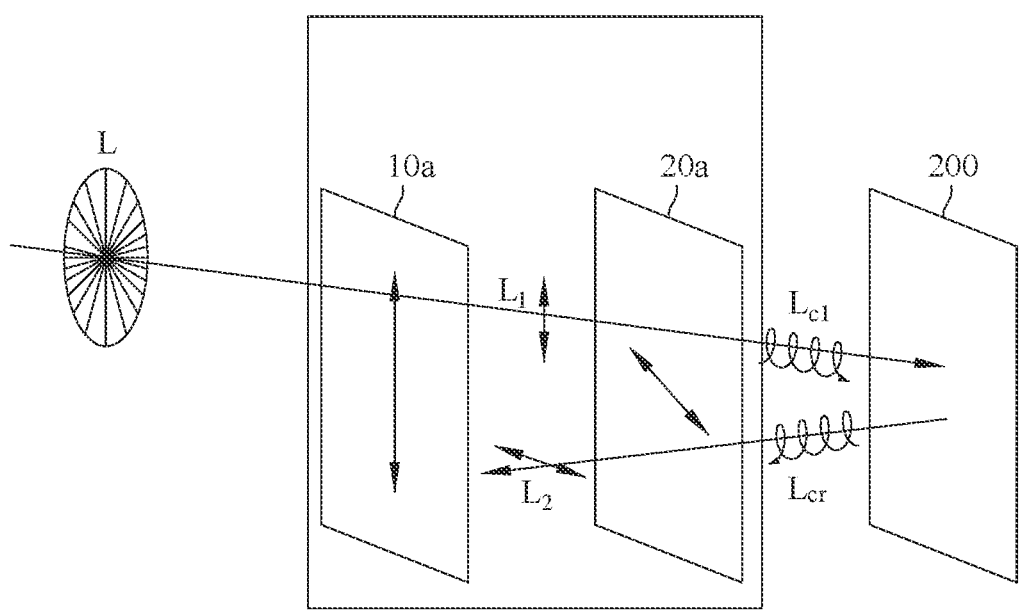
FIG. 1 is a schematic diagram of a circular polarizing plate receiving incident light from an external environment to illustrate the principle of anti-reflection.

Hereinafter, the exemplary embodiments according to the present disclosure will be described in more detail with reference to the accompanying drawings, and the advantages, features, and methods for achieving the present disclosure will be obvious. However, it should be noted that the present disclosure is not limited to the following exemplary embodiments, but can be implemented in various forms.

The terms used herein are only used to illustrate specific embodiments and are not intended to limit the present disclosure. Unless the context clearly indicates otherwise, the terms "a" and "the" in the singular form used herein also include the plural form.

In addition, it should be understood that when an element is referred to as being "on" another element, the element may be directly on the other element, or intervening elements may be present. In addition, the thickness value referred to in this disclosure is not absolute. Those skilled in the art can understand that the thickness referred to may include manufacturing tolerances, measurement errors, etc. Preferably, the thickness listed in this disclosure may have a range of 10% or 20%.

It should also be understood that although the terms "first", "second", etc. may be used herein to describe various elements, these elements should not be limited to these terms. These terms are only used to distinguish each element. Therefore, the first element in some embodiments may be referred to as the second element in other embodiments without departing from the teachings of the present disclosure. In this specification, the same reference numbers denote the same elements. In addition, the optical element will be used interchangeably with "plate", "layer", "film", or other similar terms in this text, unless otherwise specified, only the name is different.

It is worth mentioning that, since the present disclosure relates to the phase retardation value of the phase retardation material, the measurement method will be described first. In the embodiment of the present disclosure, the phase retardation value measured on a plane perpendicular to a thickness direction of an object is measured, that is, in plane retardance/retardation (R0). The embodiments of the present disclosure use a commercial device having model: AxoScan (manufacturer Axometrics, Inc.) to measure the in-plane phase retardation value of the object in the visible light wavelength range. For the brevity of data, specific wavelengths from 450 nm are recorded, for example, once for each 25 nm, until the in-plane phase retardation value of 675 nm. That is, the visible light wavelength range referred to herein is 450 nm-675 nm, and the so-called wideband range in the present disclosure can also be understood as the wavelength range of 450 nm-675 nm.

The present disclosure provides a first comparative example of an integrated touch module. The integrated touch module includes: a polymer phase retardation layer and a touch sensing structure disposed on the polymer phase retardation layer. As mentioned above, in order to integrate the electrical signal processing element (touch sensing structure) and the optical element (polymer phase retardation layer), the touch sensing structure is directly formed on the polymer phase retardation layer without the need of an additional substrate on which the touch sensing structure is mounted. The combination of the polymer phase retardation layer and a linear polarizing layer/polarizing layer can constitute an anti-reflection optical element, which can be called a circular polarizer (or circular polarizing element). In order to achieve the aforementioned integration and product thinning purposes, the polymer phase retardation layer uses a cycloolefin polymer (COP) with a thickness of 45 μm, which can be used as a quarter phase compensation layer. Compared with the commercially available ¼ phase compensation layer of a polymer stretch type, the cycloolefin polymer (COP) with thickness of 45 μm has been reduced by 50% in thickness.

In addition, in some embodiments of the present disclosure, the linear polarizing layer/polarizing layer may be a generally commercially available polarizing plate, which has a degree of polarization (DOP) greater than 98%, but the disclosure is not limited to this. The linear polarizing layer/polarizing layer can be two protective films (such as cellulose triacetate (TAC)) with polyvinyl alcohol (PVA) fixed in the middle (referred to as type A polarizing layer), or a combination of single protective film (such as TAC) and polyvinyl alcohol (PVA) material (abbreviated as polarizing layer of type B polarizing layer). The above two polarizing layers or any other forms of polarizing layers are applicable to the present disclosure, and the present disclosure is not limited to the embodiment.

According to an experimental method of the present disclosure, the incident light used enters the object under test (for example, the combination of the above-mentioned polymer phase retardation layer, touch sensing structure, and linear polarizing layer) and then passes through a reflective surface, for example, a partial mirror with reflectance of about 55% (manufacturer: 3D Lens), and then passes through the object to reflect light, and then the reflectance (R %) can be measured in the visible light range. Generally, the international standards related to optical measurement mainly include ASTM D1003, CIE 130 1998, and ISO 13468. This disclosure uses the structure of ASTM D1003 for measurement.

Figure 2:
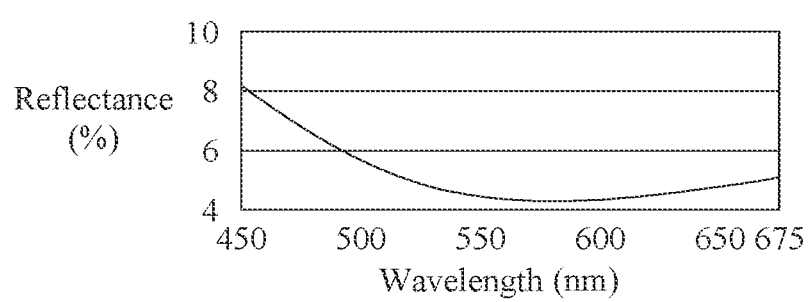
FIG. 2 illustrates a reflectance spectrum curve of reflectance of a first comparative example for full wavelength.

Please refer to Table 1 and FIG. 2. FIG. 2 illustrates a reflectance spectrum curve of reflectance of a combination of cycloolefin polymer (COP) with thickness of 45 μm used in the first comparative example and a polarizing layer of type B for full wavelength (i.e., 450 nm-675 nm). The reflectance in Table 1 is captured from the curve in FIG. 2 at a specific wavelength. As shown in Table 1, the average reflectance of the first comparative example in the visible light wavelength range is between 5% and 6%. The standard deviation of reflectance is about 1.21%. It is obvious that the reflectance of the first comparative example in the visible light wavelength range varies greatly with wavelength. From the perspective of observation, the reflectance of certain wavelengths will be particularly high, and it is easily observed that there is a color shift on the display screen. It can be evident from FIG. 2 that high reflectance often disappears in the short wavelength range of visible light in the first comparative example. For example, in the wavelength range of 450 nm-500 nm, the average reflectance is close to 7% (The average rate calculated from the reflectance of 450 nm, 475 nm, and 500 nm in Table 1 is about 6.9%. Unless otherwise specified in this disclosure, the data below is calculated in a similar way), which means that the first comparative example will reflect incident light with wavelengths of 450 nm-500 nm for observation. According to the first comparative example, it is found that the phase retardation layer of the same polymer material has a smaller thickness (comparing the cycloolefin polymer with a thickness of 45 μm selected in this example with other thicker commercial products). The problem of high reflectance (for example, >6%) occurs in the wavelength range. In addition, if the 550 nm wavelength is regarded as the central area of the visible light range, the average reflectance of the short wavelength range can be compared with the reflectance of the 550 nm wavelength to understand whether there is a sudden change in the reflectance. According to the calculation, the average reflectance of the first comparison under the wavelength range of 450 nm-500 nm is quite different from the reflectance under the wavelength of 550 nm, the difference is about 55% (calculation formula: (6.9−4.47)/4.47=54.4%). It is obvious that the reflectance in the first comparative example in the short-wavelength range (i.e., 450 nm-500 nm) will suddenly change, and the human eye will suddenly feel a large amount of reflected light in the short-wavelength range, which will cause poor viewing quality and non-uniform display performance. Furthermore, if the visible light is divided into two sections: the short-wavelength range and the medium-long wavelength range, the change in reflectance can also be analyzed from the average reflectance difference between the short-wavelength range and the medium-long wavelength range. According to the calculation, the difference between the average reflectance of the comparative example in the wavelength range of 450 nm-500 nm (short wavelength range) and the average reflectance in the wavelength range of 525 nm-675 nm (medium-long wavelength range) is about 33% (calculation formula: (6.9)−4.63)/6.9=32.9%). It is obvious that the reflectance of the first comparative example has a great variation in the two wavelength ranges of the visible light.

TABLE 1

| Wavelength (nm) | Reflectance (%) |
|---|---|
| 450 | 8.20 |
| 475 | 6.83 |
| 500 | 5.69 |
| 525 | 4.90 |
| 550 | 4.47 |
| 575 | 4.31 |
| 600 | 4.35 |
| 625 | 4.53 |
| 650 | 4.78 |
| 675 | 5.1 |
| Average | 5.31 |
| Standard deviation | 1.21 |

Table 2 shows the reflectance of the silver nanowire touch sensing structure fabricated on a 45 μm cycloolefin polymer (COP) with a thickness of 45 μm, and then combined with the B-type polarizing layer, which is measured according to the above-mentioned test method/equipment under specific visible light and shows the average value and standard deviation of the reflectance. As shown in Table 2, the average reflectance in the visible light range is 5.91%, and the standard deviation of the reflectance in the visible light range is 0.81%. In other words, after integrating the optical film (i.e., the quarter-wave phase compensation layer of COP material) and the silver nanowire touch sensing structure, the reflectance varies greatly depending on wavelengths. Especially in the short wavelength range, the average reflectance is close to 7%, which causes the problem of uneven display quality (such as color shift, etc.). That is, regardless of whether there is an integrated touch sensing structure, the problem of high reflectance in the short wavelength range found in the first comparative example needs to be solved.

TABLE 2

| Wavelength (nm) | Reflectance (%) |
|---|---|
| 450 | 7.75 |
| 475 | 6.65 |

TABLE 2-continued

| Wavelength (nm) | Reflectance (%) |
|---|---|
| 500 | 5.99 |
| 525 | 5.38 |
| 550 | 4.89 |
| 575 | 5.00 |
| 600 | 5.35 |
| 625 | 5.73 |
| 650 | 6.13 |
| 675 | 6.22 |
| Average | 5.91 |
| Standard deviation | 0.81 |

Figure 3:
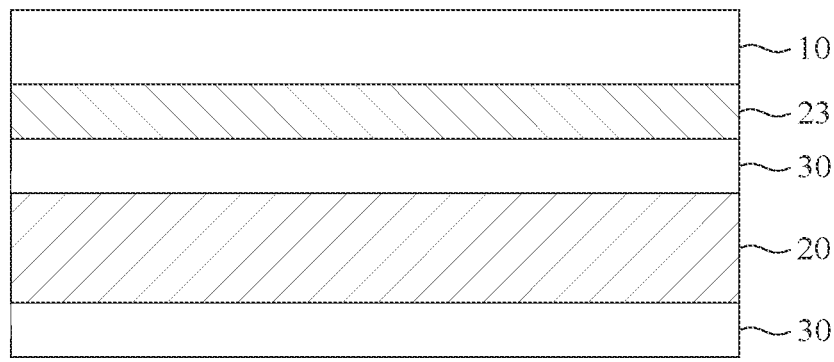
FIG. 3 is a schematic diagram of an integrated touch module according to a first embodiment of the present disclosure.

Please refer to FIG. 3, which is a schematic diagram of the integrated touch module 100 according to the first embodiment of the present disclosure. The integrated touch module 100 according to the present disclosure includes: a polymer film 20, a touch sensing structure 30 disposed on the polymer film 20, a liquid crystal phase retardation layer 23, and a linear polarizing layer 10. The polymer film 20 and the liquid crystal phase retardation layer 23 constitute a phase retardation element. The phase retardation value $R_0(550)$ of the polymer film 20 at 550 nm may be between 100 nm and 160 nm, preferably at least 130 nm. The phase retardation value $R_0(550)$ of the liquid crystal phase retardation layer 23 at 550 nm may be between 230 nm and 310 nm, preferably at least 250 nm. Specifically, the polymer film 20 is a polycarbonate (PC) material with a thickness of 25 μm (supplier: LONGHUA), and the phase retardation value at 550 nm is 131 nm. The measured phase retardation value of the polymer film 20 measured when the incident light wavelength is 550 nm is very close to the ideal quarter-wave retardation value (138.75 nm). In this way, it can be determined that the polymer film 20 according to the first embodiment of the present disclosure can be used as a quarter phase retardation layer and used as a substrate supporting the touch sensing structure 30. In one embodiment, the slow axis of the polymer film 20 is about 75 degrees. The liquid crystal phase retardation layer 23 is a single layer of liquid crystal coating, for example, made of a commercially available product: Reactive Mesogen (RM) reactive liquid crystal, with a thickness of about 2 μm, a slow axis of about 15 degrees, and the phase retardation at 550 nm is 260 nm. The phase retardation value measured when the incident light wavelength of the liquid crystal phase retardation layer 23 of the first embodiment of the present disclosure is 550 nm is very close to the ideal one-half retardation value (275 nm). In this way, it can be determined that the liquid crystal phase retardation layer 23 according to the first embodiment of the present disclosure can be used as a half phase retardation layer. In this embodiment, the optical axis (such as the aforementioned slow axis) of the polymer film 20 and the liquid crystal phase retardation layer 23 differs by about 60 degrees. The linear polarizing layer 10 is the above-mentioned polarizing layer of type B, which is a commercial product SPN32-1805M (supplier: SAPO), and the liquid crystal phase retardation layer 23 is attached to the linear polarizing layer 10 by using a polyvinyl alcohol (PVA) water glue.

In addition, both the polymer film 20 and the liquid crystal phase retardation layer 23 have the characteristics of positive dispersion. The positive dispersion herein refers to the in-plane retardation value of the material. As the wavelength increases, the retardation value of the material decreases. It can also be said that the phase retardation value of the material in the plane of long wavelength (for example, 650 nm) is a smaller value than the phase retardation value of the material in the plane of short wavelength (for example, 400 nm). In other words, $R_0(650)/R_0(400)<1$. The combination of the polymer film 20 and the liquid crystal phase retardation layer 23 can obtain the characteristic of negative dispersion, and the optical effect exhibited by the negative dispersion characteristic will be closer to the theory. A negative dispersion herein means that the retardation value of the material increases as the wavelength increases. It is worth mentioning that the forward and reverse dispersion in this embodiment is only an approximate trend, not a completely linear change. The description of the linear polarizing layer 10 mentioned above will not be repeated here.

Figure 4:
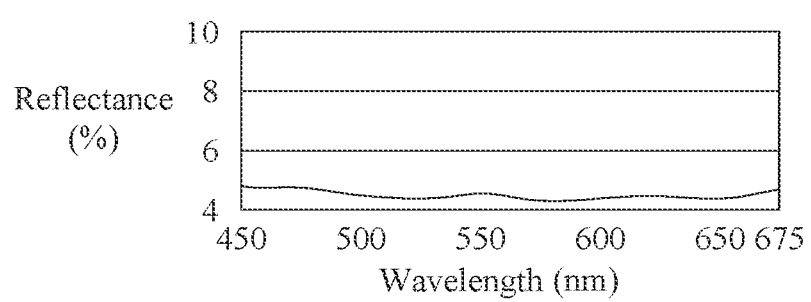
FIG. 4 is a spectral curve diagram of reflectance and wavelength of a circular polarizing element of the first embodiment of the present disclosure.

Please refer to Table 3 and FIG. 4. FIG. 4 illustrates a spectral curve of reflectance and wavelength of the first embodiment of the present disclosure, obtained by using the above-mentioned method/equipment to measure a phase retardation element having the polymer film 20, the liquid crystal phase retardation layer 23, and a linear polarizing layer 10 (excluding the touch sensing structure 30). Table 3 is the average value and standard deviation calculated based on the reflectance of FIG. 4 under specific visible light. As shown in Table 3, the reflectance of the first embodiment of the present disclosure when the incident light wavelength is 550 nm is 4.54%, the average reflectance in the visible light range is 4.51%, and the standard deviation of the reflectance in the visible light range is 0.17%. From the low average reflectance and low standard deviation of the reflectance, it is obvious that the present disclosure can provide an anti-reflection sheet with low and uniform reflectance. From the comparison between FIG. 4 and the spectrum of the aforementioned first comparative example (i.e., FIG. 2), it can be found that the first embodiment of the present disclosure has a low reflectance in the mid- to low-wavelength range of visible light, for example, in the 450 nm-500 nm wavelength range, and the average reflectance is 4.7% (calculated from the data in Table 3), so it can be shown that the first embodiment of the present disclosure has good optical characteristics and has a wideband low reflectance performance to meet actual application requirements. Compared with the aforementioned comparative example, the difference between the average reflectance of the optical layer (excluding the touch sensing structure 30) in the wavelength range of 450 nm-500 nm and the reflectance at the wavelength of 550 nm of this embodiment is quite small (calculation formula: $(4.7-4.54)/4.54=3.5\%$). Compared with the first comparative example, the calculated difference value is as much as 10 times. It is obvious that the reflectance of this example in the short wavelength range is quite uniform, which is very good for the viewer. In other words, there will not suddenly be a large amount of obvious reflected light. If the difference between the average reflectance in the 450 nm-500 nm wavelength range (short wavelength range) in this embodiment and the average reflectance in the 525 nm-675 nm wavelength range (medium and long wavelength range) is calculated, the calculation result is approximately 5.5% (calculation formula: $(4.7-4.44)/4.7=5.5\%$). Compared with the first comparative example, the difference between the two average reflectance values of the two defined ranges is also significantly reduced, so the display quality is also effectively improved.

TABLE 3

| Wavelength (nm) | Reflectance (%) |
|---|---|
| 450 | 4.83 |
| 475 | 4.74 |
| 500 | 4.49 |
| 525 | 4.37 |
| 550 | 4.54 |
| 575 | 4.31 |
| 600 | 4.38 |
| 625 | 4.47 |
| 650 | 4.37 |
| 675 | 4.66 |
| Average | 4.51 |
| Standard deviation | 0.17 |

In addition, according to the first embodiment of the present disclosure, the polymer film 20 can be directly used as a substrate. As shown in FIG. 3, the touch sensing structure 30 of the first embodiment of the present disclosure can include a single layer of the touch electrode layer. The single-layer touch electrode layer can be disposed on the polymer film 20 without additional substrates, which greatly reduces the thickness of the integrated touch module 100, so that the bendable and ultra-thin integrated touch module and products can be realized. Specifically, in this embodiment, a slurry containing silver nanowires (SNW) and/or an overcoat (OC) resin (supplier: Cambrios) is directly coated on the polymer film 20, and then the silver nanowire electrodes are formed after baking, curing, and patterning (not shown), the specific method can be referred to and introduced in US20190227650A, CN101292362, etc., which are incorporated herein by reference. The silver nanowire electrode has a high transmittance, for example, the transmittance in the visible light range is greater than about 88%, 90%, 91%, 92%, 93%, or more. The formed silver nanowire electrode is mainly located in the visible area for sensing touch, and the silver nanowire electrode must be connected to the wiring in the surrounding area to facilitate the connection with the external circuit (such as flexible printed circuit (FPC)) for signal transmission. This can be achieved by using general technology, which is not repeated here. The silver nanowire electrode is mounted on the polymer film 20, thus the polymer film 20 preferably has high strength because the wiring in the peripheral area and the wires on the FPC are usually connected by a hot pressing process (i.e., a bonding process). The polymer film 20 must provide a supporting force to transmit the pressure of the hot pressing to the connection (i.e., the bonding area), so that the wiring and the wires on the FPC can be well fixed. In an embodiment, the strength of the polymer film 20 is described by an elastic module, which is approximately between 2 and 72 GPa.

In an embodiment, the polymer film 20 must be able to withstand the process temperature for forming the aforementioned silver nanowire electrode, that is, the highest temperature in the process for forming the aforementioned silver nanowire electrode. Specifically, the highest temperature used in the steps of making silver nanowire electrodes in this embodiment is about 135-140° C. (taking into account the deviation of the equipment, the surrounding environmental impact, etc.), and the polymer film 20 needs to be selected to be able to withstand 135-140° C. process temperature to maintain the optical characteristics of the material. More specifically, the glass transition temperature (Tg) of the polymer film 20 is usually a factor used to select suitable materials. In an embodiment, the glass transition temperature of the polymer film 20 may be greater than or equal to the process temperature of 135-140° C. to maintain the optical characteristics. The glass transition temperature of the polymer film 20 of polycarbonate (PC) material used in this embodiment is 137-140° C. It can be considered that the glass transition temperature of the polymer film 20 of this embodiment is basically/substantially equal to the process temperature for making silver nanowire electrodes. It should be noted that the above-mentioned process temperature is only used as an example, and is not intended to limit the present disclosure.

The silver nanowire electrode (that is, the touch sensing structure 30) is fabricated on both sides of the polymer film 20 using the aforementioned method, and then the liquid crystal phase retardation layer 23 is formed with an optical transparent adhesive (OCA), not shown. The linear polarizing layer 10 is attached to the polymer film 20 to form the integrated touch module 100 as shown in FIG. 3. Table 4 is the first embodiment of the present disclosure to fabricate the silver nanowire touch sensing structure 30 on both sides of the polymer film 20, and the liquid crystal phase retardation layer 23 and the linear polarizing layer 10 are combined with the above-mentioned test method/equipment to obtain the reflectance under specific visible light and calculate the average value and standard deviation. As shown in Table 4, the reflectance of the first embodiment of the present disclosure when the incident light wavelength is 550 nm is 5.87%, the average reflectance in the visible light range is 5.85%, and the standard deviation of reflectance in the visible light range is 0.39%. The difference between the average reflectance of the integrated touch module 100 of this embodiment in the wavelength range of 450 nm-500 nm and the reflectance of the integrated touch module 100 in the wavelength range of 550 nm is quite small (approximately 2.2%). It is obvious that the reflectance of the present embodiment is quite uniform in the short wavelength range. It can be seen that the present disclosure can provide an integrated touch module 100 with low and uniform reflectance. It should be noted that, since the silver nanowire touch sensing structure 30 will increase the reflectance, the average and standard deviation of the reflectance are both higher than those without the silver nanowire touch sensing structure 30 (i.e., Table 3), but the difference is not large, and the requirement for the final product still can be achieved. As mentioned above, the materials of the half phase compensation coating film and the optical quarter phase compensation coating film disclosed in the patent I663460 are all liquid crystal materials, and the liquid crystal cannot be directly used as the substrate for forming the touch sensing structure 30 during the manufacturing process. Therefore, compared to the patent I663460, the present disclosure proposes a feasible integration solution of a touch sensing structure 30 and a polymer phase retardation layer, which has a better anti-reflective effect of ambient light. With this arrangement, the touch sensing structure 30 and the polymer phase retardation layer can be matched with each other, and the process conditions of the touch sensing structure 30 will not affect the optical properties of the polymer phase retardation layer. Furthermore, the polymer phase retardation layer can also meet the strength requirements of the substrate and the hot pressing process.

TABLE 4

| Wavelength (nm) | Reflectance (%) |
|---|---|
| 450 | 5.46 |
| 475 | 5.65 |
| 500 | 6.10 |
| 525 | 6.12 |
| 550 | 5.87 |
| 575 | 5.58 |
| 600 | 6.27 |
| 625 | 6.22 |
| 650 | 5.96 |
| 675 | 5.23 |
| Average | 5.85 |
| Standard deviation | 0.39 |

The second comparative example of the present disclosure is described below. The polymer film 20 is a material with a thickness of 15 μm (supplier: LONGHUA). Because the composition, thickness, and stretching conditions of the film are different from those of the first example, the glass transition temperature of the polymer film 20 of the second comparative example is 128-130° C., which is lower than the process temperature (135-140° C.) of the aforementioned silver nanowire electrode, and other conditions are the same as the aforementioned embodiment. After measuring, since the polymer film 20 of this comparative example cannot withstand the process temperature of the silver nanowire electrode, the polymer film 20 of the second comparative example of the present disclosure has a reflectance of 21% after being fabricated into the structure of FIG. 3. It is found that the polymer film 20 having Tg of 128-130° C. has lost the original optical properties. If the polymer film 20 of the second comparative example of the present disclosure is placed at a temperature of 140° C. for one hour to simulate the manufacturing process of the silver nanowire electrode and then the optical retardation value is measured, the experimental result shows that the optical retardation value is 2.05 (at a wavelength of 550 nm). This also proves that the polymer film 20 of the second comparative example of the present disclosure has no optical retardation effect after being subjected to high temperature (that is, the test temperature exceeds the glass transition temperature of material).

It should be noted that the first embodiment of the present disclosure and the second comparative example use the polymer film of the same main material, but have different glass transition temperatures. The description of the present disclosure is as follows: the sources of raw materials of the polymer used in the examples are different, and the films come from different suppliers have different compositions. Although the main components of the mold materials of the first example and the second comparative example maybe the same, other minor components/additives will be different. In addition, the stretching conditions will also cause differences in the properties of the polymer film.

In addition to the polycarbonate (PC) used in the first embodiment described above, the present disclosure can expect a material used for the polymer film 20 from the glass transition temperature of the polymer, for example, the main component of the polymer film 20 (i.e., the weight percentage is at least >50%) can be: methyl methacrylate (PMMA) with Tg>146° C., published in the paper: "Optical Poly (methyl methacrylate) copolymers Material with High Thermal Resistance" (2017), which is incorporated herein by reference; commercially available cycloolefin polymer (COP) products (supplier: Konica Minota) with Tg=165° C.; commercially available colorless polyimide (CPI) products with Tg>180° C.; commercial polyethylene terephthalate diester (PET) products with Tg between 150-155° C. or derivatives of the aforementioned compounds as the main component, and the phase retardation value measured at a wavelength of 550 nm is between 100 nm-200 nm, or at least 130 nm, or between 127 nm-134 nm, 135 nm-145 nm, 129 nm-132 nm, and 130 nm-131 nm, and the optical axis of the polymer film 20 is between 0-180 degrees, preferably 75 degrees. On the other hand, the phase retardation value of the liquid crystal phase retardation layer 23 according to the present application measured in the visible light range is between 200 nm-300 nm, or may be between 200 nm-288 nm, 237 nm-279 nm, and 259 nm-271 nm, and the optical axis of the liquid crystal phase retardation layer 23 of the liquid crystal type ranges from 0 to 180 degrees, preferably 15 degrees. It is understandable that the above-mentioned embodiment may be subject to the deviation of the measuring instrument. Therefore, the phase retardation value is only an integer. A measuring instrument with a smaller error range can be chosen to measure the phase delay value according to requirements. The illustration here is only for example, not for limiting the present disclosure.

The thickness of the polymer film 20 used according to the first embodiment of the present disclosure is only about 25 μm, the thickness of the liquid crystal phase retardation layer 23 is only about 2 μm, and the total thickness of the overall phase retardation element is 27 μm. There are two types of silver nanowire electrodes, one in which the drive electrode/sensing electrode are made on both sides of the polymer film 20, and each of the drive electrode/sensing electrode is 8.5 μm, and the other in which the drive electrode/sensing electrode are made on the same side of the polymer film 20. The thickness of the driving electrode/sensing electrode is 10 μm. Under such a thickness, it is more conducive to realize a bendable ultra-thin touch module. Therefore, the touch module and the products of the embodiments of the present disclosure can be further thinner.

The following describes the integrated touch module of the second embodiment of the present disclosure. The difference from the first embodiment is that the polymer film 20 is a material with a thickness of 28 μm (supplier: Osaka Gas), which has a main component of poly Ethylene terephthalate (PET) having a temperature Tg of 151° C. and a phase retardation value of 132 nm measured at a wavelength of 550 nm.

Compared with the foregoing comparative example, the average reflectance of this example in the 450 nm-500 nm wavelength range (about 5.6% after calculation of experimental data) and the reflectance at wavelength of 550 nm differ by only 4.5%, which shows that the reflectance of this embodiment in the short wavelength range is quite uniform, and a large amount of obvious reflected light will not be observed. In addition, the difference of the average reflectance between the 450 nm-500 nm wavelength range in this embodiment (i.e., the short wavelength range) and the average reflectance in the 525 nm-675 nm wavelength range (i.e., the medium and long wavelength range) calculated is about 7.0%. According to the average reflectance of this embodiment in the wavelength range of 450 nm-500 nm, it is believed that both the integrated touch module of the second embodiment and the first embodiment can satisfy that the average reflectance of the circular polarizing element in the visible light range is less than the requirement of 5% and the standard deviation of reflectance is less than the requirement of 0.2%, which can also meet the requirement that the average reflectance of the integrated touch module in the visible light range is less than 6% and the standard deviation of reflectance is less than 0.4%.

Furthermore, the integration scheme of the touch sensing structure 30 and the liquid crystal phase retardation layer 23 of the present disclosure has a long-term (500 hours) exposure to a high temperature (85° C.) environment with a phase retardation value change rate of less than 5%, and the weather resistance is good.

The following further provides other examples of the touch control module, so that a person with ordinary knowledge in the technical field of the present disclosure can understand possible variations more clearly. The components represented by the same component symbols as in the above embodiment are substantially the same as those described above with reference to FIG. 3, FIG. 4, and FIG. 7, and components, features, and advantages equal to that of the integrated touch module 100 will not be repeated.

The third embodiment of the present disclosure is different from FIG. 4 in that the touch sensing structure 30 of the integrated touch module 100 of this embodiment may include a first touch electrode layer (for example, a driving layer) and a second touch electrode layer (such as a sensing layer). The first touch electrode layer and the second touch electrode layer are disposed on the same side of the polymer film 20, for example, a side far away from a display module, but the present disclosure is not limited to this. The related description of this embodiment above will not be repeated here.

It can be understood that the location of the touch sensing structure 30 will not greatly affect the average reflectance of the integrated touch module 100 in the visible light range, and those skilled in the art can make variations and adjustments based on the above examples, which will not be listed here.

Hereinafter, an embodiment of applying the touch module according to the present disclosure to a display device will be described.

Figure 5:
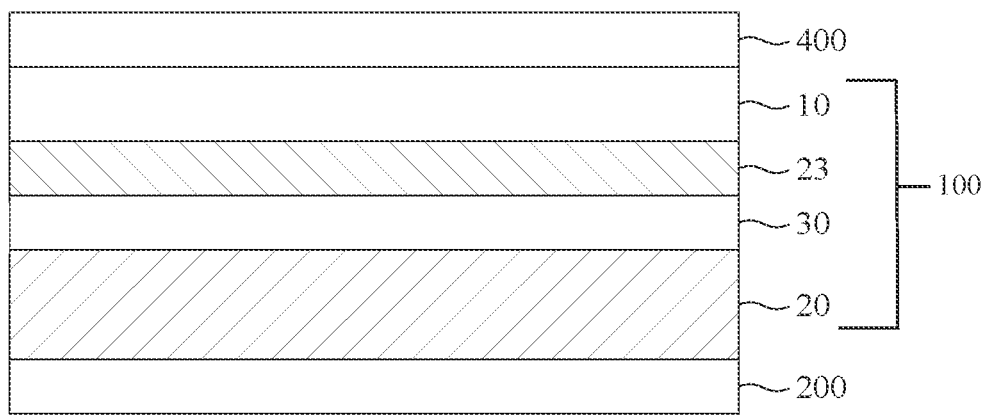
FIG. 5 is a schematic diagram of a structure of a display device according to a preferred embodiment of the present disclosure.

Please refer to FIG. 5, which is a structural diagram of a display device according to a preferred embodiment of the present disclosure. The display device 300 includes a display panel 200 and an integrated touch module 100. The display panel 200 has a visible area. The integrated touch module 100 is disposed on the display panel 200. The touch sensing structure 30 of the integrated touch module 100 substantially overlaps the visible area correspondingly. Specifically, the display panel 200 may be, but is not limited to, a liquid crystal display panel (LCD), an organic electroluminescence display panel, an organic light emitting diode (OLED) display panel, or a micro light emitting diode display panel (μLED display). In addition, the linear polarizing layer 10 is further attached to the cover 400 by optical glue (not shown). The description discussed previously of the integrated touch module 100 will not be repeated here.

Finally, the technical features of the present disclosure and its achievable technical effects are summarized as follows:

1. According to the integrated touch module 100 of the present disclosure, the average reflectance of the integrated touch module 100 in the visible light range is less than 6% and the standard deviation is less than 0.4%, thereby uniform optical characteristics for the practical requirements are achieved.

2. The polymer film 20 of the integrated touch module 100 according to the present disclosure can be used directly as a substrate without additional substrates, and the thickness of the polymer film 20 of the present disclosure is preferably only 17 μm or thinner. That is, an integrated touch module with a bendable and ultra-thin type can be realized. Furthermore, the polymer film 20 of the present disclosure combined with the liquid crystal phase retardation layer 23 has good optical characteristics and has a wideband domain phase retardation characteristic, which meets practical requirements.

The embodiments of the present disclosure are described above with specific examples. Those with ordinary knowledge in the art can easily understand the technical features, advantages, and effects of the present disclosure from the content disclosed in this specification.

The above descriptions are only preferred embodiments of the present disclosure and are not intended to limit the scope of the present disclosure. All other equivalent variations or modifications made without departing from the spirit of the present disclosure should be included in the scope of the following patent applications.

What is claimed is:

1. An integrated touch module, comprising:
a silver nanowire touch sensing structure formed on a polymer film, the polymer film having a phase retardation value of between 100 nm and 160 nm for a wavelength of 550 nm;
wherein the polymer film, a liquid crystal phase retardation layer, and a linear polarizing layer constitute a circular polarizing element, an average reflectance of the circular polarizing element in a visible light range is less than 5% and a standard deviation of the reflectance is less than 0.2%.

2. The integrated touch module of claim 1, wherein the average reflectance of the integrated touch module in the visible light range is less than 6% and the standard deviation of the reflectance is less than 0.4%.

3. The integrated touch module of claim 1, wherein the average reflectance of the circular polarizing element in a wavelength range of 450 nm-500 nm is less than 6%, and a reflectance difference between the average reflectance of the circular polarizing element in the wavelength range of 450 nm-500 nm and the reflectance for the wavelength of 550 nm is less than 5%.

4. The integrated touch module of claim 1, wherein the polymer film is configured to withstand a process temperature range of the silver nanowire touch sensing structure.

5. The integrated touch module of claim 4, wherein a glass transition temperature of the polymer film is greater than or equal to a highest process temperature of making the silver nanowire touch sensing structure on the polymer film.

6. The integrated touch module of claim 5, wherein the highest process temperature of the silver nanowire touch sensing structure is 135-140° C., and a main component of the polymer film is a methyl acrylate (PMMA), cycloolefin polymer (COP), polycarbonate (PC), polyethylene terephthalate (PET), colorless polyimide (CPI) or derivatives thereof, and the glass transition temperature of the polymer film is greater than or equal to 135-140° C.

7. The integrated touch module of claim 1, wherein the polymer film is a positive dispersion type phase retardation layer with a thickness of about 25 μm, the liquid crystal phase retardation layer is a positive dispersion type phase retardation layer with a thickness of about 2 μm, and an optical axis difference between the polymer film and the liquid crystal phase retardation layer is about 60 degrees.

8. The integrated touch module of claim 1, wherein the silver nanowire touch sensing structure comprises:
a silver nanowire electrode layer directly disposed on the polymer film.

9. The integrated touch module of claim 1, wherein the silver nanowire touch sensing structure comprises:
two silver nanowire electrode layers, the two silver nanowire electrode layers are respectively arranged on an upper surface and a lower surface of the polymer film.

10. The integrated touch module of claim 1, wherein a reflectance difference between the average reflectance of the circular polarizing element in a wavelength range of 450 nm-500 nm and the average reflectance of a wavelength range of 525 nm-675 nm is less than 10%.

11. A touch display device, comprising:
a display panel having a display area; and
the integrated touch module of claim 1, which is disposed on the display panel, wherein the silver nanowire touch sensing structure of the integrated touch module correspondingly overlaps the display area.

\* \* \* \* \*